June 17, 1969
B. WILBUR
3,449,977
GEAR MESHING ARRANGEMENT
Filed Oct. 18, 1967
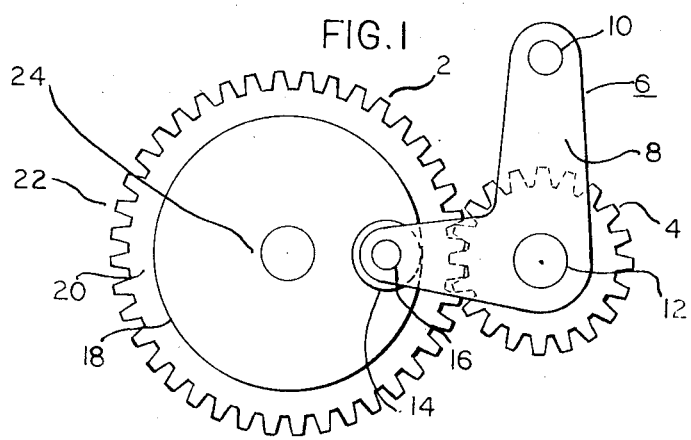
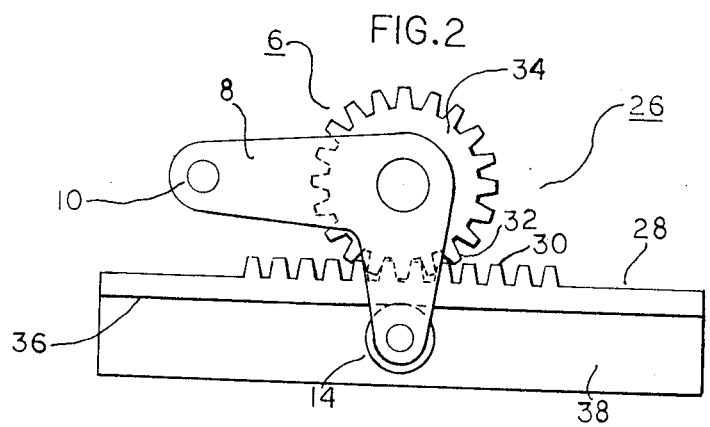
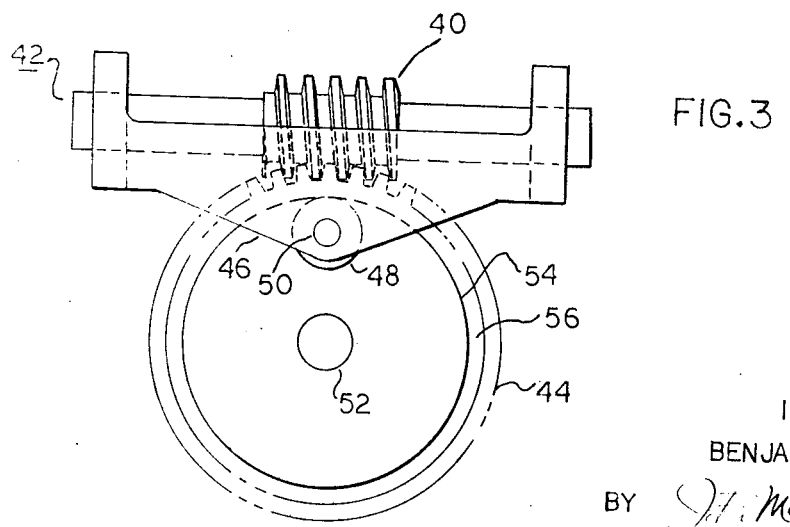
INVENTOR
BENJAMIN WILBUR
BY  *J. H. McDevitt*
HIS ATTORNEY United States Patent Office 3,449,977
Patented June 17, 1969

3,449,977
GEAR MESHING ARRANGEMENT
Benjamin Wilbur, Pittsfield, Mass., assignor to General Electric Company, a corporation of New York
Filed Oct. 18, 1967, Ser. No. 676,245
Int. Cl. F16h 57/00
U.S. Cl. 74—409                                6 Claims

ABSTRACT OF THE DISCLOSURE

A guide roller is maintained against the inside of one gear rim in a meshed gear set to reduce backlash and prevent the gears from pulling apart. The roller path is machined to the combined mesh held in contact to compensate for inaccuracies of mesh between the gears.

Background of the invention

The invention relates generally to gearing having two or more gears run together on fixed centers and provides novel means to minimize backlash between the individual gear members. More particularly, the present invention furnishes guide and retaining means which engage the gear members of a meshed gear set to prevent disengagement of said gear members and compensate for inaccuracies which produce backlash.

Several diverse arrangements have been heretofore proposed to minimize backlash between meshed gears. A well-known technique employs spring means to urge the individual gear members together which has drawbacks including added friction and wear. A different well-known approach employs precise manufacture of the individual gear members to minimize backlash therebetween when mounted on fixed centers for engagement and which manufacture may include a preliminary run-in of the mounted gears with lapping compounds to reduce mismatch attributable to tooth-spacing and tooth-form. Adjustable center distance means between the individual gear members represents still another technique employed to compensate for the backlash resulting from making the gear set free running at its tightest mesh. Unless all significant eccentricities between the meshed gears are removed, the problem of backlash still remains.

Summary of the invention

Accordingly, an object of this invention is to provide improved means for backlash reduction in a meshed gear set.

Another object of this invention is provision of improved means to reduce backlash is a meshed gear set which also reduces deflection between the gear members or changes in center distance from temperature variation.

Another object of this invention is to provide adjustable means for reduction of backlash in a meshed gear set after wear of gear teeth or other operatively associated parts of the combination.

Still another object of this invention is to provide backlash reduction means for a meshed gear set which corrects for errors imparted by each gear member of the set.

Briefly, in accordance with one embodiment of the invention these and other objects are attained by utilizing guide and retaining means between spaced-apart gear members in mesh which comprises a hinge arm upon which one of said gear members is rotatably mounted to pivot about a fixed point, and roller means on said hinge arm to engage a circular roller path defined on the other gear member in a manner which prevents separation of said members and regulates the mesh therebetween, said roller path being further defined to compensate for eccentricity and other changes in effective pitch radius of each gear member. For the desired cooperation, it is essential to have a point-by-point correspondence between meshing surfaces of the individual gear members so that the same teeth are meshed together whenever the gears are running. This takes place for gear sets wherein each of the gear members undergoes a complete revolution whenever the gear set ratio is a whole number including fractions having a numerator of one and a denominator equal to an integer. The same specified relationship is maintained for practice of the invention in gear sets wherein one or both of the individual gears undergo less than complete rotation at gear ratios other than a whole number.

From the foregoing general description it will be apparent that individual gear members which can be combined for practice of the invention can have various forms, including spur gears, a rack and pinion, and a worm gear configuration. A suitable combination illustrating one preferred embodiment of the invention comprises a pair of spur gears of different size in mesh having the smaller diameter gear rotatably mounted in the hinge arm holding the roller element for engagement of a roller path defined on the inner edge of the rim for the larger gear. Another preferred embodiment comprises a pinion gear mounted on the hinge arm and meshed with a rack member having a roller path defined therein parallel to the teeth elements of the rack for engagement of the roller means held by the hinge arm. Still a different preferred embodiment comprises the combination of a worm gear meshed with a significantly larger diameter worm wheel wherein said worm gear is rotatably held at the ends in a hinge arm which has roller means to engage a roller path defined on the inner edge of the outer wheel rim opposite the gear teeth.

Brief description of the drawings

The invention can be clearly understood from the following detailed description taken in conjunction with the accompanying drawings in which:

FIGURE 1 is a schematic view of a meshed spur gear configuration employing the essential features of the invention;

FIGURE 2 is a schematic view illustrating a rack and pinion gear configuration embodying the present invention, and FIGURE 3 is a worm gear combination employing an alternate embodiment of the invention.

Description of the preferred embodiments

The gear meshing arrangement shown in FIGURE 1 comprises a meshed pair of spur gear members 2 and 4 having guide and retaining means 6 which maintains said gear members in a particular mode of engagement having significantly reduced backlash. The guide and retaining means 6 comprises a hinge arm 8 pivoted about fixed point 10, said hinge arm having a shaft 12 to rotatably mount the smaller gear member 4. Roller means 14 is rotatably mounted on shaft 16 at the end of the hinge arm adjacent larger gear member 2. Said roller means 14 rides on a cam-like surface 18 machined on the inner edge of rim 20 opposite the teeth elements 22 in gear member 2. The cam-like surface 18 which provides the roller path is machined to the combined mesh held in contact and compensates for the inaccuracies in both gear members that arise from eccentricities, tooth spacing, tooth shape and other causes. In its preferred form the roller path is generated to compensate for inaccuracies of the pinion shaft and as well as any bearings employed. The hinge arm is advantageously constructed to resist deflection when the gears are running and can be pivoted on bearings to compensate for eccentricity of the roller means. Alternately, said hinge arm can be rigidly mounted at point 10 with a flex joint (not shown) since the flex joint introduces no backlash into the configuration. Gear member 2 is mounted on shaft 24 and has a number of teeth which is some positive integer greater than one times the number of teeth for gear member 4.

To generate the roller path, the individual gear members of the set can be matched-marked for mesh and mounted upon the shafts employed in the end-use configuration which may include bearings. Use of the hinge arm in the configuration furnishes a tool fixture wherein the mounting means for shaft 16 serves to position a cutter or grinding head to generate the roller path. An eccentric disposition of the machining means on said hinge arm can be used for progressive path generation or to compensate for tool wear. If gear member 2 is spring loaded and rotated in mesh during the machining operation, the final roller path thereby defined will accurately reflect all significant eccentricities and lack of uniform fit between the individual gear members and thereby effectively eliminate the variations responsible for backlash. A preconditioning procedure can also be adopted if the particular meshed gear set is found to have a rough or rachet action when first engaged. Rotation of the set under light load with a lapping compound until the rachet action is eliminated avoids need to compensate for this transitory variation when defining the roller path. If eccentric positioning means are employed to mount the roller element in the hinge arm it becomes possible to adjust contact of the rollers with the roller path for even closer fit or to compensate for eventual wear.

It will be noted that closer control of angular motion can be achieved with the guide and retaining means of the invention than is obtained with spring loaded split gears. The latter compensation means for backlash results in angular rotation by one-half of the split gear member which will be transmitted to other members of the gear train. By contrast thereto, the center distance between a pair of meshed gear members which is varied by cooperation of the guide and retaining means above described is such that any tendency for gear rotation resulting from backlash reduction will be far less than for split gears. It can also be seen that holding the gear members closely in mesh with the guide and retaining means of the invention has a smoothing effect upon gear rotation than can otherwise be obtained.

The gear meshing arrangement shown in FIGURE 2 comprises a meshed rack and pinion combination 26 having essentially the same guide and retaining means 6 described in connection with FIGURE 1. Rack member 28 is a bar with teeth 30 disposed along one of the longitudinal sides for engagement with teeth 32 in the associated pinion gear member 34. Again, the guide and retaining means 6 has hinge arm 8 pivoted about fixed point 10 and provides mounting means for the pinion gear and a roller element 14. Said roller travels along a roller surface 36 which lies in a direction generally parallel to the teeth plane. The roller surface is further defined by an undercut in side 38 of the rack. Generation of said roller surface can be attained in the same manner heretofore described in connection with the FIGURE 1 embodiment to yield comparable results.

FIGURE 3 illustrates still another preferred gear meshing arrangement of the invention for a worm gear application. Worm gear member 40 is rotatably mounted at each end in guide and retaining means 42 for mesh with worm wheel 44. Bracket member 46 of said guide and retaining means furnishes a support for mounting roller 48 on a shaft 50. Worm wheel 44 is rotatably mounted on shaft 52 for operative engagement with the worm gear member. The roller travels upon a roller path 54 defined on the interior edge of outer rim 56 for said worm wheel with said roller path being generated to compensate for total inaccuracy in the mesh between both gear members as previously described. Upon pivotally mounting the bracket member at a fixed point as hereinbefore described and providing drive means to rotate the worm member, it will be apparent that rotational move member at the ends of the worm member is substantially free of backlash attributable to eccentricity of mesh.

From the foregoing description it will also be apparent that a generally improved gear-meshing arrangement has been provided to compensate for the major sources of backlash found between mating gears. It is not intended to limit the present invention to the preferred embodiments above shown, however, since certain modifications of the present teachings can be made without departing from the true spirit and scope of the invention. For example, it is contemplated to provide dual roller means for engagement of separate roller paths machined on both sides of the inner edge of the gear rim. It is intended to limit the present invention, therefore, only to the scope of the following claims.

What is claimed as new and desired to be secured by Letters Patent in the United States is:

1. A gear-meshing arrangement for regulating backlash between meshed members, at least one of said gear members having a circular outer periphery with teeth disposed about said periphery, which comprises a hinge arm upon which one of the gear members is rotatably mounted to pivot about a fixed point, and roller means on said hinge arm to engage a roller path on the other gear member in a manner which prevents separation of the gear members and regulates mesh between gears, said roller path being defined to compensate for errors imparted by each gear member in the set.

2. A gear-meshing arrangement as in claim 1 wherein both gear members are spur gears and the roller path is defined on the inside rim of one gear member.

3. A gear-meshing arrangement as in claim 1 wherein the gear member mounted on the hinge arm is a spur gear and the gear member meshed therewith is a rack having the roller path aligned thereon in a direction generally parallel to the teeth elements.

4. A gear-meshing arrangement as in claim 1 wherein the gear member mounted on the hinge arm is a worm gear and the gear member meshed therewith is a worm sheel.

5. A gear-meshing arrangement as in claim 1 wherein the hinge arm has a flex joint.

6. A gear-meshing arrangement for regulating backlash between meshed spur gears having a gear set ratio which is an integer greater than one, the smaller gear being rotatably mounted on a hinge arm pivoted at one end about a fixed point, the larger gear having a set of teeth around the outer periphery along with a roller path located on the inner rim of said outer periphery, said roller path having been generated by urging the gears to mesh in the end-use configuration and machining a path to compensate for inaccuracy of such engagement, and roller means affixed to the other end of said hinge arm which engages the roller path.

References Cited

UNITED STATES PATENTS 3,238,803   3/1966   Durand _____ 74—409

FOREIGN PATENTS 676,903   12/1963   Canada.

DONLEY J. STOCKING, *Primary Examiner.*

L. H. GERIN, *Assistant Examiner.*